United States Patent Office.

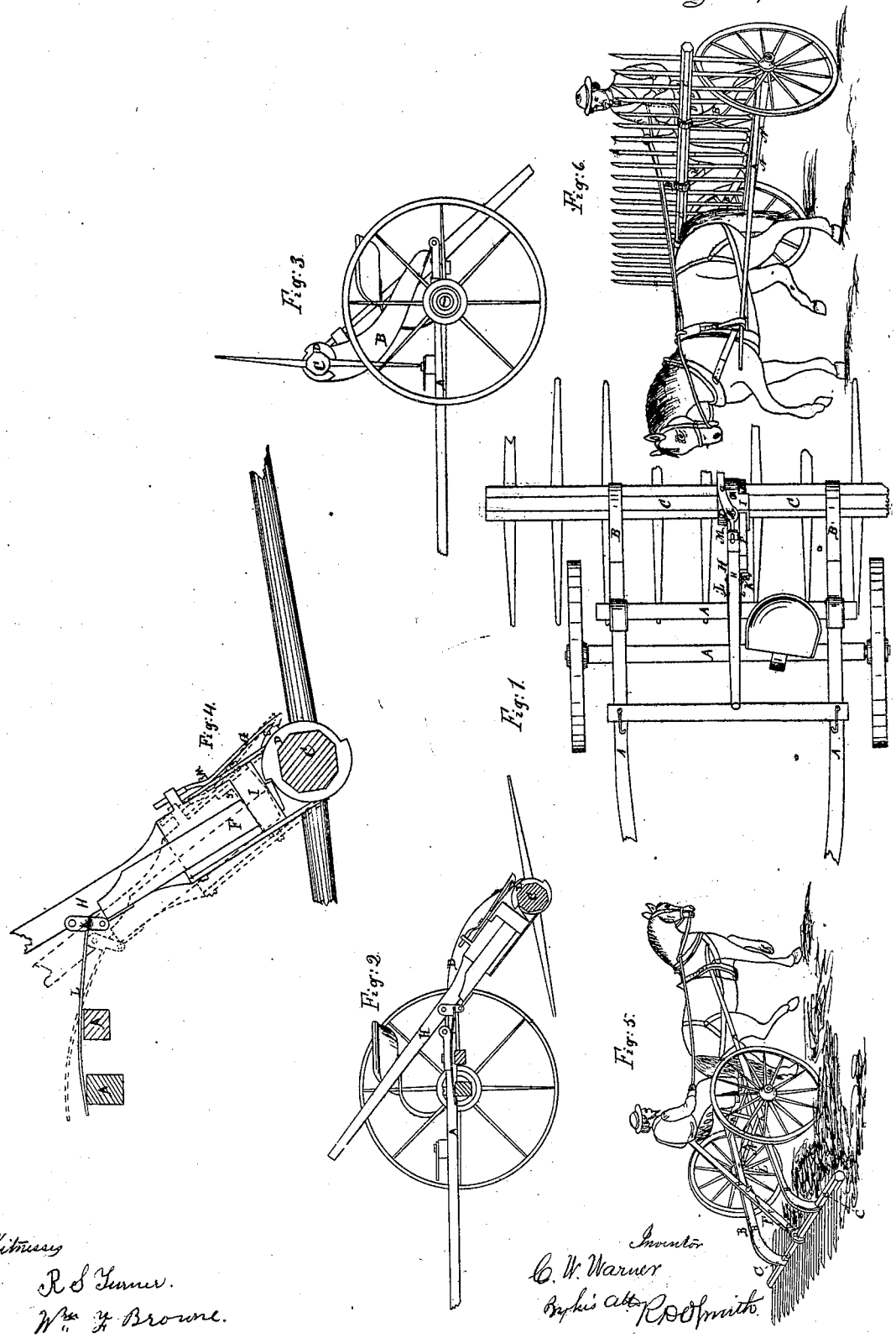

C. W. WARNER, OF NEW HAVEN, VERMONT.

Letters Patent No. 81,234, dated August 18, 1868.

---

IMPROVEMENT IN HORSE HAY-RAKES.

---

The Schedule referred to in these Letters Patent and making part of the same.

---

TO ALL WHOM IT MAY CONCERN:

Be it known that I, C. W. WARNER, of New Haven, in the county of Addison, and State of Vermont, have invented a new and useful Improvement in Horse Hay-Rakes; and I do hereby declare the following to be a full, clear, and exact description of the same, reference being had to the accompanying drawings, in which—

Figure 1 is a plan view of my machine.

Figure 2 is a sectional side elevation of the same, in working position.

Figure 3 is a side elevation, showing the rake folded for transportation.

Figure 4 is an enlarged side elevation of the rake-lever.

Figures 5 and 6 are perspective views of my rake.

My invention relates to that class of horse-rakes which are constructed with revolving rake-heads, and teeth projecting therefrom in two opposite directions, and it consists in an improved method of unlocking said rake-head, and imparting to it the initial movement in its revolution, whereby both of said operations are consummated with one movement of the hand of the attendant.

That others may understand the construction and operation of my invention, I will particularly describe it.

A A is the carriage, to which I prefer to attach my rake, C, by means of the drag-bars B B. In constructing the frame A, the ends of the shafts are permitted to project in rear of the axle, for the purpose of forming points of attachment for the hinged drag-bars B B. Said drag-bars may be curved, as shown, and at their rear ends they encircle the rake-head C by straps, which permit said rake-head to revolve freely.

About midway of the length of the rake-head C are two flanges or collars, D E, provided with notches or offsets, as shown, so that the locking-bolt F and latch G may engage with said flanges respectively, and the one restrain the rake from revolving in one direction, while the other prevents a revolution in the opposite direction. When the bolt F is withdrawn from engagement with the collar D, then the rake will be free to revolve forward, passing over the hay which has been gathered, and commencing to gather a fresh lot with the teeth which were at the rear until the said rotary movement brought them to the front. But, in order to insure the taking place of said rotary movement, it is necessary to give the rake a slight initiatory movement sufficient to cause the forward points of the teeth to catch in the ground, and this initiatory movement is imparted through the medium of the latch G, which is caused to pull the upper side of the rake-head forward, and thus throw the points of the fingers downward toward the ground.

Hitherto it has been necessary to accomplish these two purposes by separate movements on the part of the attendant: first, withdrawing the locking-bolt, and, second, canting the rake-head to cause the points of the teeth to catch in the ground. By my devices, I accomplish them both by one movement, and in such a way that there is no possibility that the apparatus may be broken by mistiming the second movement in regard to the first. The lever H is attached to the rake-head by means of a strap, which passes around said rake-head, so that the same may revolve within said strap, and the bolt F and latch G are both mounted upon said lever.

The bolt F is confined at its lower end by strap or loop I, through which it passes, and within which it is adjustable forward or backward by means of screw-pins, J, which project from the edge of the bolt, and adjust its position within the loop I. At the upper end of the bolt F is the link K, which connects said bolt to the lever H, and the lever L is rigidly attached to said link, projecting therefrom in such a position as will permit it to rest upon the axle of the carriage A, as shown in figs. 2 and 4, when the machine is in operative condition. When the outer end of this lever L is moved toward the lever H, then the link K is thereby moved to a position more nearly at right angles with said lever H, and the effect of these movements is to withdraw the bolt F from engagement with the collar D, and permit the rake-head C to revolve forward.

The latch G is made adjustable in the direction of its length by means of a slot, through which the screw M passes into the edge of the lever H.

These adjustments of the bolt F and latch G are necessary to enable the attendant not only to take up slack or lost motion in the rake-head, between the bolt F and latch G, but to enable him to adjust the position of the lever H in regard to the rake-head, so as to bring the upper end of said lever in a position convenient to his hand while the rake is in operation.

When my rake is in operation, the rake-head C lies upon the ground, with the forward teeth extended in such a position as will enable them to pass beneath the hay which is lying upon the ground. The lever L falls forward upon the axle of the carriage, and the bolt F and latch G, having engaged with notches in the collars D and E, project upward and forward to a position convenient to the driver's hand.

When, during the operation of the machine, sufficient grass has been gathered, and the attendant desires to deposit it, he presses downward upon the forward end of the lever H, thereby causing the lever L to withdraw the bolt F, and, by the action of the latch G, causing rake-head to rotate far enough to depress the forward ends of the teeth, and make them catch in the ground. As soon as they do so catch in the ground, the rake-head rises up and falls upon the ground again in advance of the mass of hay which has been just gathered, and by this rotation, deposited. When this half revolution has been performed, the bolt and latch again engage with their respective collars, and the lever H reassumes its position, as in fig. 2.

When the machine is to be transported to or from the field, it is folded over upon the machine, as shown in fig. 3.

I do not claim, broadly, a device by which the rake may be unlocked and the initial movement imparted to it by a single movement, that having been done before, but I am not aware that any revolving rake attached to wheels, has been hitherto, with a single lever projecting from the rake-head to a position convenient to the driver's hand, by a single movement of which a locking-bolt might be withdrawn, and an initial movement imparted to the rake-head in the direction of its rotation. I am not aware, either, that with any revolving rake, attached to wheels, with flexible drag-bars, so that said rake might be folded upon the carriage-frame for transportation, a single lever has ever been employed, by a single movement of which the rake-head might be unlocked, and receive its initial movement in the direction of its rotation. And further, I am not aware that the equivalents of the lever L and link K have been hitherto employed in connection with a locking-bolt, a single lever, and a revolving rake-head, such as described.

The features above enumerated are considered to be essential to produce the best results in the most satisfactory and economical way, and that my improvement lies in their embodiment in a "horse-rake."

What I claim, and desire to secure by Letters Patent, is—

In combination, with the lever H, carriage-frame A, and revolving rake C, the bolt F, link K, and lever L, or their equivalents, to operate substantially as and for the purpose set forth.

C. W. WARNER.

Witnesses:
    A. P. ROSCOE,
    D. C. HALL.